Nov. 3, 1942.  G. A. ROBERTS  2,301,080
VISOR
Filed Feb. 14, 1939
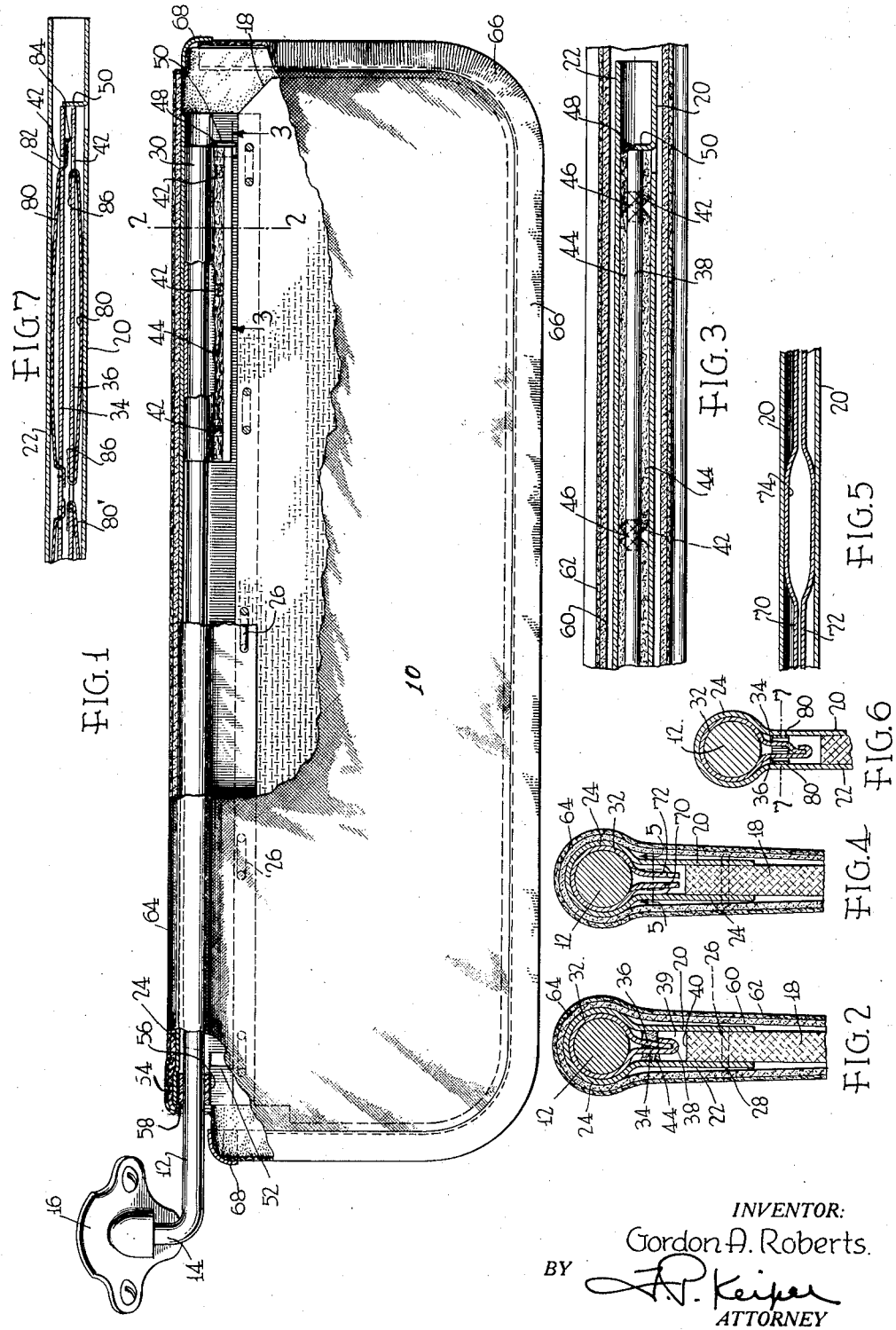
INVENTOR:
Gordon A. Roberts.
BY
ATTORNEY Patented Nov. 3, 1942

2,301,080

UNITED STATES PATENT OFFICE 2,301,080

VISOR

Gordon A. Roberts, Grosse Pointe, Mich.

Application February 14, 1939, Serial No. 256,278

20 Claims. (Cl. 296—97)

This invention relates to visors adapted for auto-motive vehicle use and more particularly to an improved friction sliding and swivel support for the same.

In visors employed in conjunction with automotive vehicles and more especially the windshields thereof, an adjustable support capable of permitting considerable variation in the placing of the visor is quite essential, in order that the same may be useful to cut out glare coming through the windshield from any direction. Further, some means should be provided in order to adequately hold the visor in any selected position, against jars and vibration, and yet yield for adjustment to other positions readily so that it may quickly be shifted as the vehicle negotiates turns and change of grade, thereby necessitating visor repositioning.

In an application Serial No. 210,834, filed May 31, 1938, there is shown an improved form of a novel friction swivel connection allowing both pivotal as well as axial movement of the visor, together with friction means adapted to yieldingly hold the visor in any adjusted angular position.

The present invention is an improvement thereover and provides a more rugged construction, which in addition offers a suitable frictional control over the axial movement of the visor as well as angular movement.

Accordingly, it is an object of the present invention to provide a visor of improved form capable of smooth frictionally controlled pivotal adjustment, and in addition capable of being slidably supported for positioning at varying distances from its support within the car body, this latter feature preferably being frictionally controlled to resist movement as well as prevent rattle, etc.

A further object of the invention is to provide a visor of the type described capable of inexpensive manufacture, yet rugged, simple and with long wearing qualities, as well as a visor easy to operate and of clean appearance.

The above and other novel features of the invention will appear more fully hereinafter from the following detailed description when taken in conjunction with the accompanying drawing. It is expressly understood, however, that the drawing is employed for purposes of illustration only and is not designed as a definition of the limits of the invention, reference being had for this purpose to the appended claims.

In the drawing, wherein similar reference characters refer to similar parts throughout the several views:

Fig. 1 is a view of the visor with its support, with a portion of the covering material cut away to expose certain details thereof.

Fig. 2 is a section taken through the visor on the line 2—2 of Fig. 1.

Fig. 3 is a section taken through the visor looking upward and on the line 3—3 of Fig. 1.

Fig. 4 is a sectional view of a modified form.

Fig. 5 is a sectional view of the form of Fig. 4 taken on the line 5—5 thereof.

Fig. 6 is a transverse section of a further modified form taken substantially on a line similar to line 2—2 of Fig. 1, and Fig. 7 is a section taken on the line 7—7 of Fig. 6.

Referring to Fig. 1 there will be seen a visor generally indicated as at 10 and supported on a rod 12. The rod has a bent portion 14 swivelled in a bracket plate 16 in any preferred manner or, for example, as illustrated in the hereinabove referred to copending application.

The visor proper comprises a heavy fibrous, relatively stiff board or support plate 18 held between spaced parallel flanges 20 and 22 formed integral with a cylindrical hinge support rod enveloping or tubular portion 24. The flanged and tubular member may be formed from a metallic strip and the flanges clamped in engagement with the visor board through any suitable fastening means. For this purpose, wire U clips 26 threaded through holes in the flanges and intervening board and having their ends 28 turned down to form a rectangular loop are provided.

The tubular portion 24 is provided with an internal diameter greater than the support rod 12 by an amount to accommodate a relatively short intervening sleeve 30, composed of a tubular portion 32 and parallel radially extending flange portions 34 and 36 secured together by a portion 38 of one flange around the other flange. In securing the flanges together in this manner, the tubular portion 32 is caused to frictionally grip the rod 12, and through the length of the flanges 34 and 36 adapted to so grip the rod with a resiliency whereby, the frictional grip is sufficient to resist all but forceful turning thereof.

As will be seen in Fig. 2 the flanges 34 and 36 nest within the space 39 formed between the parallel flanges 20 and 22 of the tubular hinge member 24, and the edge 40 of the visor board 18 so that while the tubular member 24 may slide axially upon the sleeve 30, it is keyed against relative rotation therebetween.

In order to fill in the vacant space and prevent backlash, rattle, and to provide slight friction against axial movement, the flanges 34 and 36 may be pierced as at 42, and a tough felt or other fibrous member 44 interlaced as at 46 through the holes 42 to form a silencing and friction filler between the sleeve flanges 34 and 36 and the visor flanges 22 and 24, the smooth inner surfaces against which the fibrous material rubs. The fibrous material may be a continuous loop passing around the ends of the flanges 34 and 36 as shown at 48.

In order to limit the longitudinal axial movement of the visor over the sleeve, fingers 50 and 52 may be struck into the sides of the flange 20, adapted to engage the ends of the sleeve flanges 34 and 36, and to guide the rod centrally into the tubular member 24, the latter may have an annular offset 54 adapted to receive a hard fibrous bushing 56 lubricated by wax or in any suitable manner, to slide on the rod 12. The same may be held in position by an inturned end flange 58.

The entire visor is given a finished appearance by a covering composed of a layer of fibrous material 60 having a finishing layer 62 of woven material glued or cemented thereto, the covering being wrapped around the tubular portion 24 of the visor as at 64 and covering both sides of the visor board 18. The edges are suitably finished with a binding strip 66 sewed thereto and finished at either end with ornamental metallic quarter clips 68.

A modified form of the invention is illustrated in Figs. 4 and 5 wherein the flanges 70 and 72 of the central sleeve are not secured together by a turned-over portion of one of the flanges. In this modification bearing portions 74 are struck into the flanges for engagement with the inner surfaces of the parallel flanges 22 and 20. The sleeve and its flanges are so resiliently adjusted as to provide a proper degree of friction around the rod 12 as well as friction against sliding movement of the visor axially thereof, so that adjustments are maintained throughout severe vibration and shock but yet the same is manually adjustable.

In Figs. 6 and 7 there is illustrated a yet further modification wherein the form of Fig. 1 is modified in that the interlaced felt or fibrous strand 44 is removed and leaf springs 80 substituted therefor. As illustrated, the springs can be provided with offsets 82 extending through the holes 42 to maintain them in position or if desired, the end portions 84 may be bent back as shown at 86, both forms being illustrated in the single view, although it will be understood that either form may be adapted to the exclusion of the other for both sides. Also, any desired number of leaves may be inserted in end to end relation as illustrated at 89', by common use of the same hole 42, or by employing separate pairs of holes for each leaf. It will, of course be understood that the sleeve engages the rod frictionally just as in the form of Fig. 1, and that the leaf springs, while possibly adding some frictional pressure upon the rod, are primarily for the purpose of resisting sliding movement between the visor and sleeve.

While the friction of the sleeve on the rod resisting axial movement therebetween will always exceed the friction between the visor and sleeve, thereby insuring the sleeves permanent position on the rod, the rod may obviously be provided with a very slightly reduced diameter portion to receive the sleeve should it be desired, thereby providing shoulders on the rod to prevent movement.

Thus, through the use of a sleeve composed of a formed flat strip of metal and a main visor member likewise similarly formed, a rugged visor is provided with pivotal adjustment as well as longitudinal or axial adjustment, both adjustments being adapted to be frictionally held where manually adjusted against vibration and shock, and yet free to have its position instantly changed with easy as conditions require.

Though several modifications of the invention have been illustrated and described, it is to be understood that the invention is not limited thereto, but may be embodied in various mechanical forms and arrangements as various changes in construction and form may be made without departing from the spirit of the invention, as will be apparent to those skilled in the art, reference being had to the appended claims for a definition of the limits of the invention.

What is claimed is:

1. In a visor frame and support, a support rod, a sleeve frictionally rotatable on said rod and having a radially outward extending keying means thereon, a visor frame having a rigid tubular member surrounding at least a portion of said rod and said sleeve and slidable upon said rod and sleeve and having means associated with said keying means to substantially prevent relative rotation between the member and sleeve, and a visor secured to said rigid tubular member independent of said sleeves.

2. In a visor frame and support, a support rod, a sleeve frictionally rotatable on said rod and having a radially outward extending keying means thereon, a visor frame having a rigid tubular member surrounding at least a portion of said rod and said sleeve and having means associated with said keying means to substantially prevent relative rotation between the member and sleeve, said sleeve being otherwise independent of said member, and friction means between said sleeve and member for frictionally resisting relative movement therebetween.

3. In a visor frame and support, a support rod, a sleeve rotatable on said rod and having a radially outward extending keying means thereon, a visor frame having a rigid tubular member surrounding at least a portion of said rod and said sleeve and having means associated with said keying means to substantially prevent relative rotation between the member and sleeve, said sleeve being otherwise independent of said member, and means for imposing friction against rotation between said sleeve and rod.

4. In a visor frame and support, a support rod, a sleeve rotatable on said rod and having a radially outward extending keying means thereon, a visor frame having a tubular member surrounding at least a portion of said rod and said sleeve and having means associated with said keying means to substantially prevent relative rotation between the member and sleeve, interengaging friction means between said sleeve and member, and means for imposing friction against rotation between said sleeve and rod.

5. In a visor frame and support, a support rod, a short sleeve on said rod adjacent a free end thereof, said sleeve being formed from a strip of material and having a portion wrapping around said rod and a pair of substantially radial but spaced parallel flanges together with means to secure the edges of said flanges together to impose a friction grip between the wrapping portion and the rod, a visor having a main member substantially the length of the rod and wrapped around the rod and sleeve, and having parallel spaced flanges extending in the same direction as the sleeve flanges, a visor member secured between said member flanges, the space between the member flanges, and visor member inner edge forming a keyway for said sleeve flanges, and means carried by said sleeve flanges adapted to frictionally engage said member flanges to frictionally resist axial displacement.

6. In a visor frame and support, a support rod, a short sleeve on said rod adjacent a free end thereof, said sleeve being formed from a strip of material and having a portion wrapping around said rod and a pair of substantially radial but spaced parallel flanges together with means to secure the edges of said flanges together to impose a friction grip between the wrapping portion and the rod, a visor having a main member substantially the length of the rod and wrapped around the rod and sleeve, in the same direction as the sleeve flanges, a visor member secured between said member flanges, the space between the member flanges, and visor member inner edge forming a keyway for said sleeve flanges, means carried by said sleeve flanges adapted to frictionally engage said member flanges to frictionally resist axial displacement, and means on said member at either end thereof to engage said sleeve to positively limit the axial movement of said member and visor.

7. In a visor frame and support, a support rod, a short sleeve on said rod adjacent a free end thereof, said sleeve being formed from a strip of material and having a portion wrapping around said rod and a pair of substantially radial but spaced parallel flanges together with means to secure the edges of said flanges together to impose a friction grip between the wrapping portion and the rod, a visor having a main member substantially the length of the rod and wrapped around the rod and sleeve and having parallel spaced flanges extending in the same direction as the sleeve flanges, a visor member secured between said member flanges, the space between the member flanges, and visor member inner edge forming a keyway for said sleeve flanges, means carried by said sleeve flanges adapted to frictionally engage said member flanges to frictionally resist axial displacement, means on said member at either end thereof to engage said sleeve to positively limit the axial movement of said member and visor, and means located in an end of said member adapted to slidably engage said rod.

8. In a visor frame and support, a support rod, a sleeve on said rod adjacent one end thereof, said sleeve being formed from a strip of material having a portion wrapping around said rod, and edge flanges extending substantially radially from the rod and adjacent one another, a visor hinge member arranged around said rod and sleeve and formed from a strip of material and comprising a split tubular portion having spaced flanges extending substantially parallel to one another therefrom, a visor member rigidly secured between said member flanges, said sleeve flanges having friction pads adapted to engage said member flanges thereby providing friction against axial movement therebetween.

9. In a visor frame and support, a support rod, a sleeve on said rod adjacent one end thereof, said sleeve being formed from a strip of material having a portion wrapping around said rod, and edge flanges extending substantially radially from the rod and adjacent one another, a visor hinge member arranged around said rod and sleeve and formed from a strip of material and comprising a split tubular portion having spaced flanges extending substantially parallel to one another therefrom, a visor member rigidly secured between said member flanges, said sleeve flanges having friction pads adapted to engage said member flanges thereby providing friction against axial movement therebetween, and friction against radial movement between said rod and sleeve.

10. In a visor frame and support, a support rod, a sleeve on said rod adjacent one end thereof, said sleeve being formed from a strip of material having a portion wrapping around said rod, and edge flanges extending substantially radially from the rod and adjacent one another, a visor hinge member arranged around said rod and sleeve and formed from a strip of material and comprising a split tubular portion having spaced flanges extending substantially parallel to one another therefrom, a visor member rigidly secured between said member flanges, one of the flanges of said sleeve being bent around and embracing the other to cause frictional embrace between said sleeve and rod.

11. In a visor frame and support, a support rod, a sleeve on said rod adjacent one end thereof, said sleeve being formed from a strip of material having a portion wrapping around said rod, and edge flanges extending substantially radially from the rod and adjacent one another, a visor hinge member arranged around said rod and sleeve and formed from a strip of material and comprising a split tubular portion having spaced flanges extending substantially parallel to one another therefrom, a visor member rigidly secured between said member flanges, one of the flanges of said sleeve being bent around and embracing the other to cause frictional embrace between said sleeve and rod, and leaf spring friction means being secured to said sleeve flanges and bearing against said member flanges.

12. In a visor frame and support, a support rod, a short sleeve on said rod adjacent a free end thereof, said sleeve being formed from a strip of material and having a portion wrapping around said rod and a pair of substantially radial but spaced parallel flanges together with means to secure the edges of said flanges together to impose a friction grip between the wrapping portion and the rod, a visor having a main member substantially the length of the rod and wrapped around the rod and sleeve, and having parallel spaced flanges extending in the same direction as the sleeve flanges, a visor member secured between said member flanges, the space between the member flanges, and visor member inner edge forming a keyway for said sleeve flanges, and means carried by said sleeve flanges adapted to frictionally engage at least one of said member flanges to frictionally resist axial displacement.

13. In a visor frame and support, a support rod, a short sleeve on said rod adjacent a free end thereof, said sleeve being formed from a strip of material and having a portion wrapping around said rod and a pair of substantially radial but spaced parallel flanges together with means to secure the edges of said flanges together to impose a friction grip between the wrapping portion and the rod, a visor having a main member substantially the length of the rod and wrapped around the rod and sleeve and having parallel spaced flanges extending in the same direction as the sleeve flanges, a visor member secured between said member flanges, the space between the member flanges, and visor member inner edge forming a keyway for said sleeve flanges, means carried by said sleeve flanges adapted to frictionally engage at least one of said member flanges to frictionally resist axial displacement, means on said member at either end thereof to engage said sleeve to positively limit the axial movement of said member and visor, and means located in an end of said member adapted to slidably engage said rod.

14. In a visor frame and support, a support rod, a sleeve on said rod adjacent one end thereof, said sleeve being formed from a strip of material having a portion wrapping around said rod, and edge flanges extending substantially radially from the rod and adjacent one another, a visor hinge member arranged around said rod and sleeve and formed from a strip of material and comprising a split tubular portion having spaced flanges extending substantially parallel to one another therefrom, a visor member rigidly secured between said member flanges, said sleeve flanges having a friction pad adapted to engage at least one of said member flanges thereby providing friction against axial movement therebetween, and friction against radial movement between said rod and sleeve.

15. In a visor frame and support, a support rod, a sleeve on said rod adjacent one end thereof, said sleeve being formed from a strip of material having a portion wrapping around said rod, and edge flanges extending substantially radially from the rod and adjacent one another, a visor hinge member arranged around said rod and sleeve and formed from a strip of material and comprising a split tubular portion having spaced flanges extending substantially parallel to one another therefrom, a visor member rigidly secured between said member flanges, one of the flanges of said sleeve being bent around and embracing the other to cause frictional embrace between said sleeve and rod, and leaf spring friction means being secured to at least one of said sleeve flanges and bearing against at least one of said member flanges.

16. Visor mechanism comprising, in combination, a supporting rod, a visor panel, a metal strip extending along and secured to one margin of the panel, said strip provided with a tubular portion freely journalled on the rod for rotation thereabout and movement lengthwise therealong and having spaced apart wall portions, a panel adjustment and retaining member having a tubular portion grippingly embracing the rod for resisted rotatable adjustment thereabout and having a lip disposed between the wall portions of the panel strip holding the panel to rotate therewith about the rod, said strip adapted for resisted slidable movement along the lip lengthwise of the rod.

17. Visor mechanism comprising a supporting rod, a visor panel mounted thereupon for rotatable and longitudinal adjustment with respect thereto, panel adjustment and retaining means grippingly embracing the rod for rotatable adjustment thereabout and to maintain said positions of adjustment, said panel coupled with the adjustment and retaining means to rotate therewith about the rod and to permit slidable adjustment of the panel relative to the means longiudinally of the rod.

18. In a visor frame and support, a support rod, a visor frame having a rigid tubular member surrounding at least a portion of said rod, a resilient friction sleeve interposed between and independent of said rod and tubular member, and means on said sleeve cooperating with means on one of said rod and member for preventing relative rotation of said interposed sleeve with resilient friction sleeve interposed between and for resiliently frictionally engaging the other of said rod and member for yieldingly resisting relative rotation between said rod and member.

19. In a visor frame and support, a support rod, a visor frame having a rigid tubular member loosely and rotatably surrounding at least a portion of said rod, resilient friction means interposed in the space between and independent of said rod and tubular member and means on said interposed means cooperating with means on one of said rod and member for preventing relative rotation of said interposed means with respect to the one of said rod and member and for resiliently frictionally engaging the other of said rod and member for yieldingly resisting relative rotation between said sleeve and other of said rod and member.

20. In a visor frame and support, a resilient sleeve comprising a resilient sheet of material wrapped to form an open seam tubular member with radial outwardly extending spaced flanges from the edges of the open seam, and means for securing the flanges together at a point radially outwardly spaced from the seam, whereby a resiliently expandable tube is provided.

GORDON A. ROBERTS.